(12) United States Patent
Pierce et al.

(10) Patent No.: US 7,466,922 B2
(45) Date of Patent: Dec. 16, 2008

(54) FLEXIBLE CONTROL AND STATUS ARCHITECTURE FOR OPTICAL MODULES

(75) Inventors: Jay J. Pierce, Melbourne, FL (US); Darrel Kanagy, Melbourne, FL (US); David Schneider, Melbourne, FL (US); Christopher A. Zuhlke, Indian Harbour Beach, FL (US)

(73) Assignee: JDS Uniphase Corporation, Milpitas, CA (US)

( * ) Notice: Subject to any disclaimer, the term of this patent is extended or adjusted under 35 U.S.C. 154(b) by 571 days.

(21) Appl. No.: 11/167,410

(22) Filed: Jun. 27, 2005

(65) Prior Publication Data

US 2005/0286902 A1 Dec. 29, 2005

Related U.S. Application Data

(60) Provisional application No. 60/583,587, filed on Jun. 28, 2004.

(51) Int. Cl.
*H04B 10/04* (2006.01)
*H04B 10/06* (2006.01)
(52) U.S. Cl. ............... 398/135; 398/182; 398/202
(58) Field of Classification Search ............ 398/135, 398/138, 182, 202
See application file for complete search history.

(56) References Cited

U.S. PATENT DOCUMENTS 5,956,168 A 9/1999 Levinson et al.

| | | | |
|---|---|---|---|
| 2002/0063924 A1* | 5/2002 | Kimbrough et al. | 359/125 |
| 2005/0084269 A1* | 4/2005 | Dallesasse et al. | 398/135 |
| 2006/0147215 A1* | 7/2006 | Hahin et al. | 398/135 |
| 2007/0031148 A1* | 2/2007 | Li et al. | 398/79 |

OTHER PUBLICATIONS

4th Edition "Reference Document for 300 Pin 10gb Transponder", Aug. 14, 2002, 300Pin MAS Group, pp. 1-47.

* cited by examiner

*Primary Examiner*—Jason Chan
*Assistant Examiner*—Nathan M Curs
(74) *Attorney, Agent, or Firm*—Allen, Dyer, Doppelt, Milbrath & Gilchrist, P.A.

(57) ABSTRACT

The invention relates to optoelectronic modules for generating and/or receiving optical signals for use in fiber-optic communication systems, such as optical transponders or transceivers, having a reconfigurable control and status (C&S) interface with a host device. The optoelectronic module includes an electrical multi-pin host connector having a plurality of pins for communicating a plurality of digital C&S signals between the host and the module, functional hardware responsive to the digital control signals and comprising sensing means for generating digital status signals, and processing means formed by an FPGA and a processor for processing the digital C&S signals. The FPGA is disposed in communications paths between the host connector on one side, and the functional hardware and the processor on the other side, and programmed for routing each of the discrete C&S signals between the C&S pins of the host connector and the processor, and between the C&S pins and the functional hardware, thereby providing reconfigurability of said routing by downloading a different set of FPGA instructions.

18 Claims, 5 Drawing Sheets

FLEXIBLE CONTROL AND STATUS ARCHITECTURE FOR OPTICAL MODULES

CROSS-REFERENCE TO RELATED APPLICATIONS

The present invention claims priority from U.S. Patent Application No. 60/583,587 filed Jun. 28, 2004 entitled "Flexible digital control and status architecture for optical modules", which is incorporated herein by reference.

TECHNICAL FIELD

The present invention relates to control and status signaling architecture of optical modules for fiber-optic communication systems.

BACKGROUND OF THE INVENTION

Fiber-optic communication systems are widely used for transmitting a high volume of voice, video and data information over medium to large distances. These systems typically include complex equipment that aggregates multiple information streams from a plurality of customers or customer sites into high data rate signals, and transmits these high data rate signals over an optical fiber of a fiber-optic link.

To be transmitted over an optical link, the data has to be first converted from its original electrical format to an optical format by modulating a light source to form an optical signal. Data carried by the optical signal then must be converted back to an electrical format before it can be processed by a recipient, or routed by a routing device, such as a network switch. A number of protocols define the conversion of electrical signals to optical signals, transmission of those optical signals, and the reverse conversion into the electrical domain, including SONET, SDH, and the ANSI Fibre Channel (FC) protocol. These electro-optical and opto-electrical conversions at the ends of an optical link are typically implemented using transceiver or transponder modules. Each transceiver module typically contains a laser transmitter circuit capable of converting electrical signals to optical signals, and an optical receiver capable of converting received optical signals back into electrical signals. Transponders are transceivers that include electrical multiplexing and de-multiplexing functions, which are typically required in high bit rate transmission such as 10 Gb Ethernet, OC-192 (10 Gb/s) and OC-768 (40 Gb/s). Conventional optical transponders typically receive electrical signals in parallel, serialize the data represented by these signals, convert the serialized data into a light-based signal and couple that signal to an outbound optical fiber. Similarly, conventional optical transponders typically receive a serialized light-based data stream, convert that data stream to an electrical equivalent, de-serialize that data, and provide the de-serialized electrical data, i.e., data in a parallel format, to a plurality of output terminals. To ensure reliable communications with minimum loss of data, each of these internal transponder operations, as well as its overall performance, has to be precisely and automatically controlled and monitored.

Modem developments in optical communication networks impose contradictory requirements on the optoelectronic modules they employ. The wide variety of different types of networks where optical transponders and other optoelectronic modules are used, necessitates having a large variability in transponder characteristics. Furthermore, due to the proprietary nature of telecommunication systems used in optical networks, different customers often have differing requirements for particular aspects of the module design even when the modules are to be used in a similar type of application. These two factors, in combination with a relatively large number of system integrators operating in the market and a large number of sometimes competing transmission protocols, push the module manufacturers towards developing multiple modifications for each type of optoelectronic modules. On the other hand, interoperability requirements for modules from different manufacturers, as well as the need to reduce manufacturing and especially development cost of the modules, demand standardization of the transponder and other optoelectronic modules to a highest possible degree, especially with respect to their electrical and optical interfaces.

Efforts have been made to meet this seemingly contradictory requirements by adding certain amount of flexibility in the module's design, in particular their optical, i.e. the network-side, interface, for enabling their operation in different types of networks. For example, U.S. Pat. No. 5,956,168 in the names of Levinson et al. discloses a dual optical fiber transceiver having an on-board a microcontroller including a multi-protocol state machine for establishing a full duplex connection whenever the other device operates in compliance with either the Open Fiber Control (OFC) protocol or a standard "laser transmitter always on" protocol. Other optical transponders have been suggested and/or currently used in the art that are capable of operating at different data rates, by either automatically detecting the data rate of an incoming optical signal, or after receiving an external "rate change" control signal from the host device.

In addition to the network-side interface, a transceiver or transponder module is also electrically interfaced with a host device—such as a host computer, a shelf of a communication equipment rack, or a line card, via a compatible electrical connection port. The electrical interface with the host device, apart from providing electrical connections for passing the client data traffic to and from the transponder module, is also used by the host device to control and monitor many different aspects of the module's operation, thereby ensuring its reliable operation and conformity to the network's requirements. These control and monitor functions are carried out by means of a number of digital controls and status (C&S) signals, which can be exchanged between the host device and the module using either a serial bus connection, a multitude of discrete communication lines between the host and the module typically established using a multi-pin connector wherein each pin corresponds to a certain C&S signal, or both.

To improve interoperability between optical transponders from different manufacturers, various multiple source agreements (MSA) have been adopted by transponder manufacturers, defining basic features of the transponder electrical interfaces, including the C&S interface. For example, a group of leading optical manufacturers developed a set of standards for 10 Gb/s and 40 Gb/s optical transponder modules called the 300PIN MSA for 10 and 40 Gigabit Transponders, which specifies a set of C&S signals to be supported by the transponders, and their pin allocations for the module's 300 pin connector. Other standards and MSAs may exist that define alternative connector and C&S signal configurations.

The existent industry standards and MSAs allow for a considerable degree of freedom in implementing the C&S signals they specify. This freedom allows module manufacturers to provide MSA-compliant transponders having differing means for generating the MSA-defined C&S signals and differing configurations of the C&S interface, thereby enabling them to satisfy varying requirements of particular system integrators for their specific systems and applications.

Some customers may also decide to use non-MSA compliant transponders, or substitute some of the MSA-defined C&S signals with other signals per their system's requirements.

However, currently existing optoelectronic modules, such as optical transponders, have insufficient flexibility of the C&S interface, so that variations in customer and system requirements thereto often necessitate making changes in the module's printed circuit board design. In particular, existing optoelectronic modules with multi-pin connectors in which the C&S signals are individually routed from/to their respective pins within the module, such as the 300PIN MSA-compliant transponders, typically require a new circuit board design whenever a different routing of the C&S signals in the module is needed. Therefore, in the heretofore existing transponders, the customer-driven C&S interface variability has often been accomplished at the expense of longer transponders' development cycle and higher transponder cost.

It is therefore an object of the present invention to provide an optoelectronic module having a flexible C&S interface that can be reconfigured without hardware and circuit board changes.

It is another object of the present invention to provide an optical transponder or transceiver module for fiber-optic communication systems having a C&S interface to a host device formed by a plurality of pins of a multi-pin connector of the module, wherein the pin assignments to C&S signals can be reconfigured by downloading a different set of software instructions without hardware and printed circuit board changes.

SUMMARY OF THE INVENTION

In accordance with the invention, an optoelectronic module is provided for transmitting or receiving optical signals through a fiber-optic link. The module has a reconfigurable control and signal interface, and comprises: an electrical I/O port for connecting the module to an external host device, said I/O port comprising first connection means for providing discrete electrical connections therebetween for a plurality of digital control and status (C&S) signals, said plurality of digital C&S signals comprising digital control signals and digital status signals; an optical port for connecting to the fiber-optic link; functional hardware responsive to the digital control signals; processing means for processing the plurality of digital control and status signals, the processing means comprising a processor and an FPGA; electrical circuitry for establishing communication paths between the electrical I/O port of the module, the processing means and the functional hardware; wherein the FPGA is disposed in the communication paths between said first connection means on one side, and the functional hardware and the processor on the other side, and programmed with an instruction set for routing each of the discrete control and status signals between the first connection means and the processor, and the first connection means and the functional hardware, thereby providing reconfigurability of said routing by downloading a different set of FPGA instructions. The functional hardware comprises electro-optic generating means for generating an output optical signal, and/or opto-electronic receiving means for receiving an input optical signal and for converting thereof into a received electrical signal, and sensing means for providing status information for generating the digital status signals.

In accordance with one aspect of this invention, the I/O electrical port comprises a multi-pin connector, the first connection means comprises a first plurality of pins, and the FPGA has a plurality of ports electrically connected to the first connection means by a plurality of electrical connection leads for communicating the plurality of digital C&S signals therebetween, so that each of the digital C&S signals is associated with a different pin from the first plurality of pins, said pin electrically connected to one of the ports of the FPGA for routing the digital C&S signals according to the FPGA instruction set.

According to one embodiment of the present invention, a total number of the FPGA ports connected to the first connecting means exceeds a total number of the C&S signals routed by the FPGA.

In another aspect of the present invention, the optoelectronic module provided by the invention is a transponder module for transmitting and receiving optical signals through the fiber-optic link, wherein the functional hardware comprises: electro-optic generating means for generating an output optical signal; opto-electronic receiving means for receiving an input optical signal and for converting thereof into a received electrical signal; electrical multiplexing means for multiplexing a plurality of input electrical data signals received from the host device into a multiplexed electrical data signal for communicating thereof to the electro-optic generating means; and, electrical de-multiplexing means for de-multiplexing an electrical data signal provided by the opto-electronic receiving means into a plurality of parallel output electrical data signals for communicating thereof to the host device; wherein the sensing means include one or more sensors coupled to the electrical multiplexing means, and one or more sensors coupled to the electrical de-multiplexing means, for generating digital status signals for passing thereof to the FPGA.

BRIEF DESCRIPTION OF THE DRAWINGS

The invention will be described in greater detail with reference to the accompanying drawings which represent preferred embodiments thereof, wherein.

DETAILED DESCRIPTION

In general, the present invention relates to optoelectronic modules having a digital control and status (C&S) interface, such as modules used in optical communications for transmitting and receiving optical signals through a fiber-optic link, which are commonly known as optical transponders or optical transceivers.

In operation, the modules are connected to and are in communication with an external host device. The external host device can be a computer, a test station, a telecommunication equipment shelf, a line card of an optical communication system, or another appropriate host device having a compatible port.

In the context of the present invention, the words "control and status interface" or "C&S interface" of a module are used to mean a plurality of digital control and status signals that in operation are exchanged between the module and an external host device, in combination with hardware connection means of the module for providing electrical connections between the module and the host for communicating the plurality of C&S signals, such as a multi-pin connector or other appropriate electrical connector.

The plurality of C&S signals is typically formed by digital control signals that in operation are passed from the host device to the module, and digital status signals that are passed from the module to the host device.

The words "discrete C&S signal" are used herein to mean a control or status signal having a single function, i.e. dedicated for controlling a single operating parameter of the module, or representing a status of a single parameter or a single unit of the module, and having a dedicated electrical connection in the module-host interface. A typical discrete digital C&S signal is a one bit message.

By way of example only, the present invention is described hereinafter in this specification in reference to optoelectronic modules for receiving and transmitting optical signals, which are commonly known as optical transponders and are used at receiving and transmitting ends of a fiber-optic communication links, and more particularly, in reference to 300PIN MSA compliant optical transponders, as specified, for example, in a 4$^{th}$ edition of "*Reference Document For* 300 *Pin* 10 *gb Transponder*", Aug. 14, 2002, published by the 300PIN MSA group, which is incorporated herein by reference. In such transponders, a typical digital C&S signals is embodied as one of two possible voltage levels at a corresponding to said signal pin of the mutli-pin connector 110.

Reference will now be made to the drawings to describe presently preferred embodiments of the invention, wherein like features are labeled with like numerals. It is to be understood that the drawings are diagrammatic and schematic representations of the presently preferred embodiments, and are not limiting the present invention, nor are they necessarily drawn to scale. Various blocks shown in the block diagrams presented in the drawings are to be understood as functional blocks rather than as separate pieces of equipment unless stated otherwise, and can be realized in hardware or software or a combination thereof, depending on a particular implementation, and may include one or more integrated circuit (IC) chips.

In the diagrams where the blocks are shown connected to each other with a plurality of arrows, the arrows are meant to represent wire-line, i.e. electrical or optical, connections between respective hardware blocks, and logical directions of signal flow, wherein bidirectional arrows represent bidirectional signal flow, single-line arrows represent a single wireline connection or a flow of a single discrete signal, and a double-line arrow represent a parallel connection, e.g. a multi-line electrical connection, or a serial bus for transmitting a serial signal wherein multiple discrete signals can be multiplexed.

Figure 1:
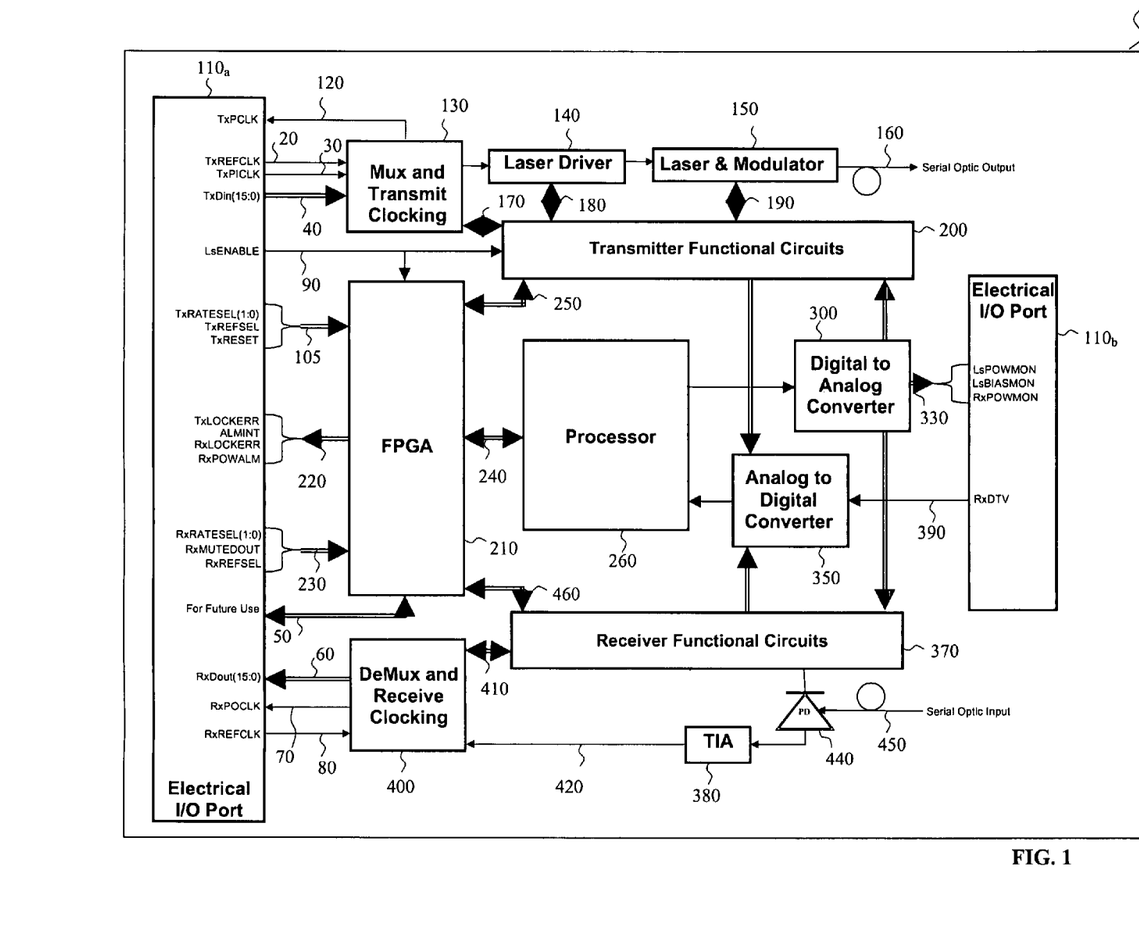
FIG. 1 is a block diagram of a transponder module in accordance with the present invention.

An exemplary embodiment of a transponder module having a reconfigurable control and status (C&S) interface is shown in FIG. 1 and is hereafter described.

The transponder module 100 is a device configured to convert an input electrical data signal received from a host device into an optical output signal for transmitting thereof through an optical communication link, and to convert an optical signal received from the optical link into an electrical data signal for passing thereof to the host device. In the exemplary embodiment described herein, the input or output electrical data signal consists of N parallel data streams, which are, respectively, multiplexed or de-multiplexed in the transponder to convert to or from the optical domain, wherein N equals 16. In other embodiments, N can be e.g. 4 or other integer number, preferably a power of 2. In some embodiments, N can be equal to one, in which case electrical multiplexing and demultiplexing blocks 130 and 400 described hereinbelow can be omitted. By way of example, the host device for the transponder embodiments described hereinafter is a line card of an optical communication equipment shelf.

With reference to FIG. 1, the transponder module 100 includes an electrical I/O port shown herein as two blocks 110$_a$ and 110$_b$, a serial optical input port 450, a serial optical output port 160, and several functional blocks forming a receive path between the input optical port 450 and a received signal portion of the electrical I/O port block 110$_a$, and a transmit path between a transmit signal portion of the electrical I/O port block 110$_a$ and the optical output port 160. The transponder module 100 further includes processing means for processing the plurality of C&S signals, the processing means formed by a processor 260, which can be implemented e.g. as a microcontroller or a digital signal processor, and a field-programmable gate array (FPGA) device 210, hereinafter referred to as the FPGA 210. According to a feature of the present invention, the FPGA 210 has a plurality of ports electrically connected to the first connection means of the I/O port 110$_a$ by a plurality of electrical connection leads represented in FIG. 1 by arrows 105, 220, 230, for communicating the plurality of digital C&S signals therebetween. In some embodiments, the processor 260 can be a functional block programmed within the FPGA 210. The components and blocks of the transponder module 100 are preferably mounted on a printed circuit board (pcb), attached to a housing.

The electrical I/O port 110$_{a,b}$, which provides electrical connections between the module 100 and the host, may be embodied as a single electrical connector or as multiple electrical connectors.

The electrical signals, which in operation are communicated through the electrical I/O port 110$_{a,b}$, include two main groups of signals: a first group formed by the digital C&S signals, and a second group consisting of the input and output electrical data signals and their associated clock signals. These first and second groups of signals are also referred to hereinafter as a first and second pluralities of signals. The first group includes digital control signals TxRateSel, TxRefSel, TxReset, RxRateSel, RxMuteDout, RxRefSel, and digital status signals TxLockErr, AlmInt, RxLockErr, and RxPowAlm, which are described hereinbelow; the second group includes input data signals TxDin(15:0), output data signals RxDout(15:0), and associated clock signals TxRefClk, TxPIClk, TxPClk, RxPOClk, RxRefClk which are also described hereinbelow.

In some embodiments, the electrical signals communicated through the electrical I/O port 110$_{a,b}$ includes a third group of analog C&S signals; in the transponder embodiments shown in FIG. 1, the third group of signals includes analog C&S signals LsPowMon, LsBiasMon, RxPowMon, and RxDTV which are briefly described hereinbelow. This group of analogue signals, however, has little bearing on the architectural solution of the present invention.

Accordingly, the I/O port 110$_{a,b}$ includes first connection means providing a first plurality of discrete electrical connections between the host device and the module for the discrete digital control and status (C&S) signals, and second connection means for providing dedicated electrical connections between the host device and the module for the electrical data and clock signals. In the embodiments where the electrical I/O port 110$_{a,b}$ is implemented using a single multi-pin electrical connector, the first and second connection means are formed by a first and second group of pins, wherein each signal from the first or second group has a pin dedicated thereto from the first or the second group of pins respectively. In other embodiments, the first and second connection means can be implemented as separate connectors. In the exemplary embodiment described hereinafter, the electrical I/O port 110$_{qb}$ is a single 300 pin MSA connector, and the transponder module 100 is a 300 pin MSA compliant transponder. Hereinafter in this specification we will be referring to the pins from the second group also as the data and clock (D&C) pins, and we will be referring to the pins from the first group also as the C&S pins.

The optical ports 450 and 160 are preferably implemented using commercial fiber-optic connectors, for example of LC, SC or FC type fiber-optic connectors typically used in fiber-optic telecommunication equipment.

The functional hardware blocks forming the receive and transmit paths of the transponder 100, in particular blocks 130, 140 and 200 of the transmit path, and blocks 370 and 400 of the receive path, include various sensors for monitoring various aspects of operation of the transponder 100. These sensors, which together with associated electrical circuitry assisting in their operation form sensing means of the transponder module 100, either directly generate digital control signals, or provide status information which is used by the transponder processing means for forming the digital status signals. Various hardware implementations of the sensing means are known in the art and are not described in detail in this specification, except when illustrating routing options of the corresponding digital status signals.

The transmit optical path of the transponder 100 includes electrical multiplexing means 130, electro-optic generating means 150, a driver circuitry 140, and transmitter functional circuits 200. The electrical multiplexing means 130 includes a multiplexing and transmit clocking circuitry, and is hereinafter referred to as a multiplexer, or Mux block 130.

In operation, the multiplexer block 130 multiplexes N parallel input streams of data, each having a bit rate R/N, into a serial data stream having a bit rate R, which is then passed to the electro-optic generating means 150 via the driver circuitry 140. The Mux block 130 preferably includes a clock multiplication unit (CMU), clock filters, an electrical signal N:1 multiplexer, sensing circuit for detecting lock errors, and FIFO buffers, wherein the abbreviation "FIFO" stands for "first in, first out" and refers to how the buffers handle the input data, as known to those skilled in the art.

The electro-optic generating means 150 for generating an output optical signal operate to transform an electrical serial data signal having the bit rate R to an optical domain, and can be implemented using a directly modulated superluminescent or laser diode, or a continuous wave (CW) laser diode followed by an electro-optic (EO) modulator or an absorption modulator. The exemplary embodiment described herein employs a single-mode CW laser diode followed by an EO modulator. In a preferred embodiment, the CW laser diode and the modulator are assembled together in a small enclosure to form a transmitter optical subassembly (TOSA), which is then mounted onto the pcb, whereto other blocks of the transponder 100 are affixed. However, in other embodiments, the laser diode and the modulator can be mounted directly onto the pcb, e.g. to reduce parasitic reactance of wire leads connecting the TOSA to the pc board. Hereinafter in this specification, the electro-optic generating means 150 will also be referred to as the optical transmitter 150, or simply as the transmitter 150.

The driver circuitry block 140, hereinafter also referred to as the laser driver 140, conditions the serial data stream output as needed to drive the transmitter 150. As shown schematically by a bi-directional arrow 180, the driver circuitry block 140 receives control signals from a block 200 of Transmitter Functional Circuits (TFC), which also exchanges control and status signals with the optical transmitter 150, as shown by a bidirectional arrow 190. The TFC block 200 includes various transmitter-related control circuits, such as level shifting circuitry, closed loop control circuits, sensor interfaces, drivers, glue logic, etc. Examples of these circuits include: laser external shutdown control circuit, adjustable gain photodiode amplifiers, thermo-electric cooler (TEC) closed loop control, transmit clocking switch and oscillator drivers, laser bias current source and sensor, power supplies for transmit sections. The TFC block 200 may also include a direct link from an FPGA 210 to the Mux block 130 and the laser driver 140, e.g. for communicating transmitter-related C&S signals from the FPGA 210 to the respective blocks.

By way of example, in operation the Mux block 130 receives N=16 parallel data streams TxDin(15:0) from the host via 16 dedicated pins of the E/O port 110$_a$, as schematically shown with an arrow 40, and two clock signals: a Transmit Reference Clock signal TxREFCLK represented by an arrow 20, and a Transmit Parallel Input Clock signal TxPICLK represented by an arrow 30. The clock signal TxREFCLK is a reference clock from which the CMU generates a serial data clock signal at the clock rate R. TxREFCLK can be either a rate R/16 or R/64 signal, selectable by a control signal TxREFSEL. The clock signal TxPICLK, which is synchronized to the TxREFCLK, is used by the Mux block 130 to clock the parallel transmit data into the transponder. The Mux block 130 also sends to the host a clock signal TxPCLK 120—Transmit Parallel Output Clock, which is generated in the module and sent back to a framer in the host device, e.g. a line card, to be used to clock the parallel data out of the framer/line card.

Other embodiments of the transponder module with features according to the present invention may not require electrical multiplexing or de-multiplexing; those embodiments may not include the Mux block 130 or a DeMux block 400.

The receive optical path operates in a reverse relationship with the transmit optical path; and includes opto-electronic receiving means 440 having an optical input optically coupled to the input optical port 450, and an electrical output electrically coupled to a transimpedance amplifier (TIA) 380. The opto-electronic receiving means 440, also hereinafter referred to as a photodiode 440, can be a PIN photodiode or an avalanche photodiode (APD) or any other opto-electronic device suitable for receiving the input optical signal at the data rate R from the fiber-optic communication link, and for converting thereof into a received serial electrical signal and having an appropriate bandwidth.

The photodiode 440 is also electrically coupled to a Receiver Functional Circuits (RFC) block 370, which includes electrical circuits for performing various receiver control related function such as: closed loop control of the photodiode bias current, sensor interfaces, drivers, glue logic, level shifting for shifting a photodiode bias current sensor level from a relatively high DC voltage, as required by the photodiode 440 depending on its type and the data rate, down to a range that can be handled by an instrumentation amplifier for generating of the RxPowMon and RxPowAlm signals. Examples of the electrical circuits within the RFC block 370 include: a photodiode bias voltage generation circuitry, a photodiode bias current sensor, a thermistor interface circuitry, and a hardware receive power alarm circuit. The RFC block 370 may also include a direct link from the FPGA 210 to the DeMux block 400 for communicating receiver-related C&S signals from the FPGA 210 thereto.

The TIA 380, which may include a limiting amplifier, has an output port which is coupled to electrical de-multiplexing means 400 formed by de-multiplexing and receive clocking circuitry, also hereinafter referred to as a DeMux block 400, which receives the serial electrical signal 420 at the rate R from the TIA 380, and de-multiplexes it into N parallel streams of the received data signals. The DeMux block 400 includes clock and data recovery (CDR) circuits, a limiting amplifier, a sensor for detecting lock errors signaling loss of clock recovery by the CDR, and an electrical N:1 demultiplexer. The DeMux block 400 is optional and can be omitted in some transponder embodiments of the present invention.

In the embodiment shown in FIG. 1, the DeMux block 400 outputs a parallel electrical signal RxDout(15:0) consisting of 16 data streams at a rate R/16 each, or 16 Receive Data Output Channels carrying the demultiplexed data received serially via the fiber link in a parallel format, and passes it to the host device using differential signaling through 32 dedicated pins of the I/O port 110$_a$, two pins per data channel, as shown schematically by an arrow 60. The DeMux block 400 also receives from the host device via a connection path 80 a clock signal RxREFCLK—Receive Reference Clock, and passes to the host device via a connection path 70 a clock signal RxPOCLK—Receive Parallel Out Clock. The RxREFCLK clock signal is used to synchronize the receive clocking from the demux 400 with the host device, and can be either R/16 or R/64 rate clock signals selectable by a control signal RxREFSEL. The RxPOCLK clock is sent out by the module 100 as the clock with which to latch the 16 receive data output channels RxDout. This block also outputs a digital status signal RxLOCKERR—Receive Lock Error, indicating whether the RxREFCLK and a clock signal recovered from the serial input data stream are of substantially the same rate. The clock signals, as well as the data signals, in the exemplary embodiment described herein, use differential signaling and therefore use each 2 pins of the I/O port 110.

Similarly to the transmitter 150, optical components of the receive path, i.e. the photodiode 440 and, if required, focusing optics, can be assembled as a separate receive optical sub-assembly (ROSA), which is then mounted onto the pcb and electrically connected thereto using appropriate connectors. In some embodiments, the ROSA may include electrical components of the receive path such as TIA 380 and a limiting amplifier for decreasing parasitic capacitance of electrical connections therebetween. In other embodiments, the photodiode 440 is mounted directly onto the module's pcb.

The aforedescribed components and blocks of the receive and transmit paths form functional hardware, which may include firmware, of the transponder module 100. In operation, this functional hardware is monitored and controlled internally by the processor 260 and the FPGA 210, and externally by the host device, by means of the digital C&S signals.

As stated hereinabove, these digital C&S signals consist of the plurality of digital status signals, which the transponder module 100 sends to the host device via the I/O port 110$_a$, and the plurality of digital control signals, which it receives from the host via the same port. Flow directions of these digital C&S signals to/from said port 110$_a$ are represented in FIG. 1 by arrows 105, 220 and 230, each of which also represent a plurality of electrical connections leading to/from the second group of pins of the multi-pin connector 110$_a$, one pin per signal. The on-board processing means 260 and 210 process these C&S signals as required, and use them to control and monitor different aspects of operation of the module 100 and its internal hardware components and blocks. Examples of these signals include the aforementioned TxREFSEL and RxREFSEL digital control signals used to select between two clock rates. Other examples of the digital control signals include: a signal which purpose is to select a destination chip on a serial communication bus for a next communication from the host, and host-generated signals for changing the data frequency within the module. The status signals are originated in various blocks of the receive and transmit paths described hereinabove, which include sensing means for detecting status of an important operational parameter of a corresponding block. A typical digital status signal is a fault condition indicator of a particular hardware block or the transponder module 100 itself.

Industry standards and Multiple Source Agreements may include provisions that regulate which C&S signals are to be used for a particular module type, and prescribe the correspondence between the connector pins of the I/O port 110$_a$ and the standardized digital C&S signals. By way of example, a list of the C&S signals and their corresponding C&S pins for a 300PIN MSA 10 Gb (gigabit) transponder is given in the document "*Reference Document For* 300 *Pin* 10*gb Transponder*", cited hereinabove, which is incorporated herein by reference. A partial list 6f the digital C&S signals, as well as other signals shown in FIG. 1, with brief descriptions thereof is also given hereinafter at the end of this section. Apart from the digital C&S signals, the 300PIN MSA has also provisions for analog control and monitoring signals to be sent from the transponder module 100 to the host, as shown in FIG. 1 by an arrow 330, which represents three analog output monitoring signals LsPowMon, LsBiasMon and RxPowMon, and by an arrow 390 representing an analog input signal RxDTV. These analog control and monitoring signals are not a part of the digital C&S interface described in the present specification.

Nevertheless, the 300PIN MSA, as well as other MSAs, allows for a large degree of flexibility in the module's C&S interface, including flexibility in formats of particular C&S signals, and flexibility in routing and processing of the digital C&S signals within the transponder module.

At the same time, optical modules, such as electrical/optical transmitters, receivers, transceivers, transponders, tunable lasers, etc., often require differing configurations of the C&S interface, depending on a specific application and a customer. By way of example, these differing configurations may include different performance specifications for MSA-prescribed signals, such as delay time and accuracy, and some of them may include additional, e.g. customer-specified digital C&S signals for which the MSA does not allocate a pin. Heretofore, the required variability of the C&S interfaces has typically been accomplished by making changes in the pcb design, requiring additional development resources and increasing customer cost and lead time.

An important feature of the present invention, which distinguishes it from the prior art, is that this invention provides optoelectronic modules having a C&S interface that can be re-configured, e.g. according to customer requirements, without changing the pc board design and without introducing any other hardware changes, simply by downloading a different set of software instructions into the on-board processing means of the module. For this purpose, the transponder module 100 includes the FPGA 210 as a part of the digital C&S interface of the module. According to the present invention, each of the discrete digital C&S signals, regardless of their destination or origin in the transponder 100, is first coupled to an FPGA device 210 using a dedicated electrical wire-line connection between a corresponding C&S pin of the connector 110$_a$, and one of input/output ports of the FPGA 210, so that each digital C&S signal has a discrete electrical path to the FPGA, and each C&S pin of the I/O port is connected to an electrical port of the FPGA dedicated to said C&S pin by the FPGA instruction set.

Advantageously, the architectural solution of the present invention enables using the FPGA 210 simultaneously as a signal routing hub for substantially all C&S signals, as well as a logic and signal processing resource, providing the flexibility to re-configure the C&S interface without creating a new printed circuit board design, thereby reducing the required development resources. This arrangement enables different customers to have different purposes for the same digital C&S connector pin, provided that the signal to be communicated via the pin is digital; it also enables changing a digital signal from control to status and vice versa.

Figure 2:
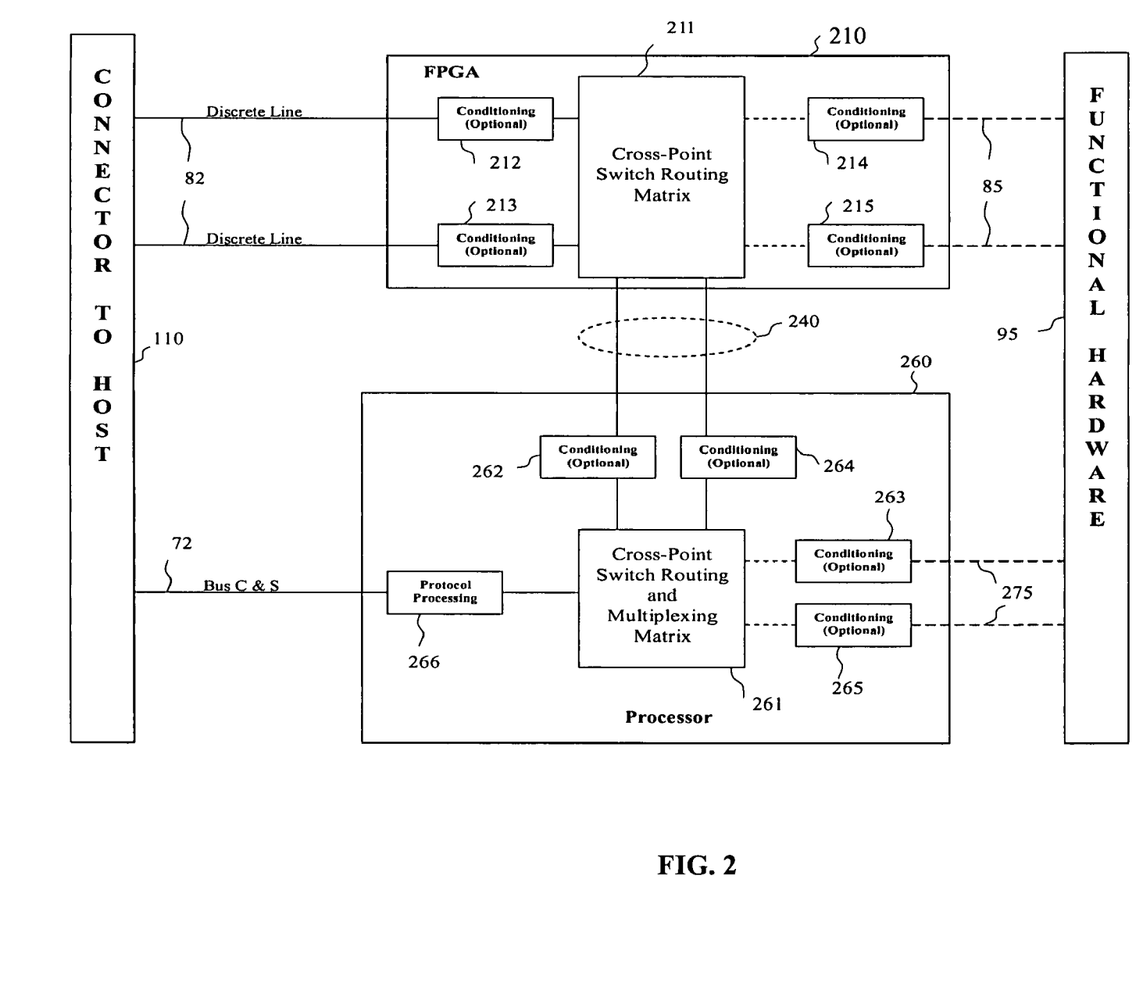
FIG. 2 is a block diagram showing general architecture of an optoelectronic module according to the present invention.

FIG. 2 shows the general C&S signal routing architecture of the optical transponder 100 having features of the present invention, wherein the FPGA 210 serves as a hub for the digital C&S signals between the host connector 110 on one side, and the processor 260 and the functional hardware 95 responsive to the digital control signals on the other side. Note that in other embodiments the functional hardware 95 may include other components than those described hereinabove with reference to FIG. 1.

Placing the FPGA 210 and the processor 260 in the communication paths between the I/O port 110 on one side, and the functional hardware 95 and the processor 260 on the other side, and programming the FPGA 210 with an instructions set to form therein a cross-point switch routing matrix 211 for routing each of the discrete control and status signals between the I/O port 110 and the processor 260, and the I/O port 110 and the functional hardware 95, enables logic functions to be performed and the purpose of the C&S signals to be changed within the module itself by downloading a different set of FPGA and, optionally, processor instructions, which therefore provides for multiple configurations without changing the printed circuit card or the components on it.

In some embodiments, the I/O port 110 includes pins that are not allocated to any particular signal; for example, the 300PIN MSA designates some of the pins of the 300-pin connector as being "for future use" (FFU). In a preferred embodiment of the present invention, at least some of these FFU pins not carrying any C&S signal are also included in the digital C&S group of pins, and discrete wire-line connections 50 from these pins to the FPGA 210 are provided. In this embodiment, a total number of the FPGA ports connected to the first connecting means exceeds a total number of the C&S signals routed by the FPGA 210. This enables "on-demand" provisioning of new C&S signals as required by a particular customer, without making any hardware changes to the module's pc board and its components, provided that the on-board hardware has the required capability. In some cases, the new function can be performed solely in the FPGA 210 to meet faster response times, as illustrated by the optional signal conditioning blocks 212-215 programmed within the FPGA 210.

As those skilled in the art would appreciate, many of the C&S signals may require processing which is too complex to be implemented solely in the FPGA 210. By routing a C&S signal to the FPGA 210 and pre-provisioning within the FPGA 210 the switch matrix 211 to the processor 260 using an appropriate FPGA instructions set, a customer-requested pre-programmed function can be performed by the processor 260, as illustrated by the optional signal conditioning blocks 262-265. The FPGA 210, however, enables a certain flexibility in implementing or modifying signal processing functions which are not optimally implemented or impossible to implement in the embedded processor 260, such as data acquisition decimation, i.e. filtering and down-sampling a data signal to decrease its effective sampling rate. The processor 260, as well as the FPGA 210, can also have direct communication paths to the functional hardware 95, as illustrated in FIG. 2 by the dashed lines 275, and a cross-point switch matrix 261 for routing the C&S signals between the FPGA 210 and the functional hardware 95.

In some embodiments, the processor 260 can be programmed to modify one or more of the control signals received from the FPGA 210 for forming a modified control signal, and then to communicate the modified control signal back to the FPGA 210 for further routing thereof to the functional hardware 95.

Such control signal routing is used, for example, in embodiments, wherein the processor 260 has an optional serial bus connection 72 to the host device, e.g. an I2C bus, for communicating with the host's controller and for providing an additional communication path for the digital control and status signals to the host. In these embodiments, the transponder module 100 can be in a software (SW) control mode, when its operation is controlled using the digital control signals received from the host computer via the I2C bus 72, or in the hardware (HW) control mode, when its operation is controlled by the host via the I/O port connector 110 and the FPGA 210. To distinguish between similar-purpose digital control signals received via the pin connector 110 and via the communication bus 72, the former are also referred to hereinafter as the HW control signals, while the latter—as SW control signals. In order to enable this two-mode operation, in some embodiments the FPGA 210 is programmed to route one or more of the HW digital control signals or a copy thereof, to the processor 260, which is programmed to modify them by multiplexing with the corresponding SW digital control signal received from the host controller via the communication bus 72. The modified digital control signals, which contain bits received from the host connector 110 or via the I2C bus 72, are then routed by the switch matrix 261 of the processor 260 to the functional hardware 95 either directly, or via the FPGA 210. The switch matrix 261 also includes instructions for multiplexing the digital status signals received either directly from the functional hardware 95 or via the FPGA 210 for sending over the I2C bus 72.

The digital C&S signals that require fast responses and therefore have to be processed and communicated between the host and the internal functional hardware blocks 95 with minimal delays, are preferably routed by the FPGA 210, with or without logic operations within the FPGA 210, bypassing the processor 260. The C&S signals that have less stringent time limitations but require more complex processing are routed to the embedded processor 260 wherein they are processed by the processor software. By way of example, a signal can be designated as "slow" if a response time τ associated with this signal is about 10 ms or more, and a "fast" if τ is considerably less than 10 ms; this designation however depends on the amount of signal processing involved, software code efficiency, and reflects processing capabilities of particular microprocessor and FPGA types used in the module. The placement of the FPGA 210 between the embedded processor 260 and the host enables at least some of the digital C&S signals to be changed from "fast" to "slow" and vice versa by changing only the FPGA and embedded processor programs. Also, such changes in the C&S interface functions as re-defining of individual connections, or pins, from an "input" to "output" and vice versa, or re-defining a default voltage signal of the pins to a "1"or a "0", etc., can be handled strictly by the FPGA 210 without any changes in pcb traces.

A C&S signal is thereby designated as "fast" or "slow" based on the programs loaded into the FPGA 210 and, possibly, the embedded processor 260.

A typical control signal is routed by the FPGA 210 to the processor 260 without any logical processing or with only minimal processing thereof. The flow of these signals is shown in FIG. 1 by a bi-directional arrow 240, which also corresponds to a wire-line connection that can be implemented as a parallel connection, or a serial bus. In FIG. 2 this wire line connection is schematically shown as signal traces 240. In the exemplary embodiment described hereinbefore with reference to FIG. 1, the connection 240 is a serial bus providing a single communication link for several multiplexed control signals so to reduce the number of printed circuit traces required between the FPGA 210 and the processor 260. The processor 260 then multiplexes the control signal from the FPGA with that received from the host via the I2C bus 72. The selected discrete or serial bus signal is then processed as needed by the processor. In some cases the signal is routed back to the FPGA with minimal processing for distribution to the appropriate piece of hardware. In other cases, the processor performs complex actions based upon the received control signal.

The routing of a C&S signal from the FPGA 210 to the processor 260, then back to the FPGA 210 and, finally, to a hardware module enables providing an alternative module configuration wherein the processor 260 is taken out of the signal path to reduce an associated time delay and enhance speed. Such speed enhancements are usually performed upon customer request.

Turning back to FIG. 1, an example of a digital control signal which bypasses the processor 260 because of speed requirements is a TxReset signal, which controls resetting the FIFO buffer within the Mux block 130. Within the FPGA 210, the signal TxReset can be combined with processor commands, and then quickly routed along the path shown by arrows 250 and 170 to the 16:1 multiplexer chip of the Mux block 130 to reset the FIFO buffer. An example of the relevant processor command is a signal to clear the FIFO buffer when performing a "power on" reset initialization, to ensure that there is no random "garbage" data in the buffer. Minimizing this time is important as a FIFO error usually causes data errors to occur.

There can be a small number of digital C&S signals which have to be routed directly to a designated hardware block, e.g. for safety reason. An example of such a digital control signal is the LsEnable signal, which turns on and off optical power generation by the laser; this signal has to be communicated directly to the laser external shutdown control circuitry of the TFC block 200, as shown by an arrow 90, as fast as possible with minimum circuitry to ensure a prompt laser shutdown when required by the laser safety considerations. However, even these signals are communicated to the FPGA 210 as illustrated in FIG. 1 by an arrow branching from the arrow 90 towards the FPGA 210, for their further routing in the module 100 as required for performing other functions.

Digital status signals have two typical routing schemes. Digital status signals that are generated in digital format by the module's hardware are typically routed through the FPGA 210 to both the host connector 110, and to the processor 260 for performing optional signal processing and for communicating thereof to the host computer via the I2C bus 72. Again with reference to FIG. 1, examples of such signals include locking error alarms RxLockErr and TxLockErr, which are generated by the DeMux 400 and the Mux 130 respectively to signal a loss of data-clock locking. In some cases, optional signal conditioning by the FPGA 210 can be performed before or after the branching thereof to the connector 110 and the processor 260. For example, in some embodiments a "deglitch" processing can be performed by the FPGA 210 on the RxLockErr signal generated by the DeMux 400 before it is passed to either the processor 260 or the host, to remove short, false "lock" indications sometimes appearing in the DeMux generated RxLockErr signal.

Another group of digital status signals are digital signals that are derived from analog signals by the processor 260. These status signals have a simpler routing scheme; they are typically generated by the processor 260 based upon an analog value received from a functional hardware block, and then sent via the communication link 240 to the FPGA 210, which routes them to the host connector 110. It is also possible for the FPGA 210 to route the signal to an internal hardware device if a certain action is required from said device based upon the derived digital status signal. An example of such digital status signal is a receiver power alarm signal RxPOW-ALM which is generated when the electrical signal outputted by the photodiode 440 falls below a threshold value.

Examples of how the digital C&S routing architecture of the present invention enables to re-configure the C&S interface will now be given for the embodiment of the optical transponder module shown in FIG. 1

First, several possible routing schemes of the RxPowAlm signal enabled by the transponder module architecture of the present invention will be described with reference to FIG. 3, wherein fixed signal routes are shown with solid lines or arrows, and variable, or reconfigurable signal routes shown by dashed lines or arrows.

The 300PIN MSA response time standard for the RxPow-Alm is a maximum 10 ms with a +/−1 dB accuracy. Here, that requirement is met by monitoring a bias current of the photodiode 440 using the bias current sensor, not shown, within the receiver bias generation block 770, which is a part of the RFC block 370. The photodiode bias current provides information on the received optical signal, which is pertinent to the digital control signal RxPowAlm indicating whether the photodiode 440 receives an optical signal of sufficient strength; hereinafter in this specification, this information will be also referred to as first information. As illustrated by an arrow 720, a signal proportional to said receiver current is fed to an analogue-to-digital converter (A/D) block 350, and then passed in digital format to the processor 260 for performing a software algorithm and for generating the RxPowAlm signal, which in this case will be referred to herein as a software (SW) RxPowAlm signal. This SW RxPowAlm signal is then sent to the FPGA 210, as schematically shown by a dashed arrow 780.

However, for some applications a faster but less accurate monitoring of the receiver power alarm condition can be preferable. For this applications, the functional hardware of the receive path is provisioned to provide second information pertinent to the digital status signal RxPowAlm directly to the FPGA 210 bypassing the processor 260; the FPGA 210 can then be programmed to form said digital status signal RxPow-Alm for outputting thereof via a pin of the electrical I/O port 110 based upon either the first information, the second information, or a combination thereof. In the embodiment shown in FIG. 3, this is accomplished by pre-provisioning a hardware comparator 700 having two input leads 710 and 740 for receiving the receiver current signal from the Rx bias generation block 770, and an alarm threshold value from the processor 260, and for outputting a hardware alarm HW RxPow-Alm 750 to the FPGA 210. This alarm is generated much faster than the SW RxPowAlm, bypassing the sampling and processing delays and accuracy enhancements of the processor's software algorithm.

The transponder module 100 may also be configured to provide, upon a customer's request, a third category of the receive power alarm for signaling a very fast catastrophic failure, for detecting e.g., a fiber break. In this case, the alarm threshold can have quite a bit of inaccuracy, but it is important to minimize a delay time associated with the alarm, to enable fast protection switching to a backup fiber link to minimize loss of data. To provision such an option, the DeMux block 400 includes an alarm circuit that can perform this function, and a corresponding fast "loss of signal" (LOS) alarm is fed to the FPGA 210, as illustrated by an arrow 760.

Therefore, in designing the transponder module 100 according to the exemplary embodiment described herein, three types of the receiver's loss of signal alarm are pre-provisioned. However, different customers may have different usage for these signals. Routing of these signals through the FPGA 210 before passing any of them to the host connector 110 enables providing customers with multiple configuration choices of the C&S interface, wherein any of these signals can be outputted through any of the available digital C&S pins of the connector 110.

Figure 3:
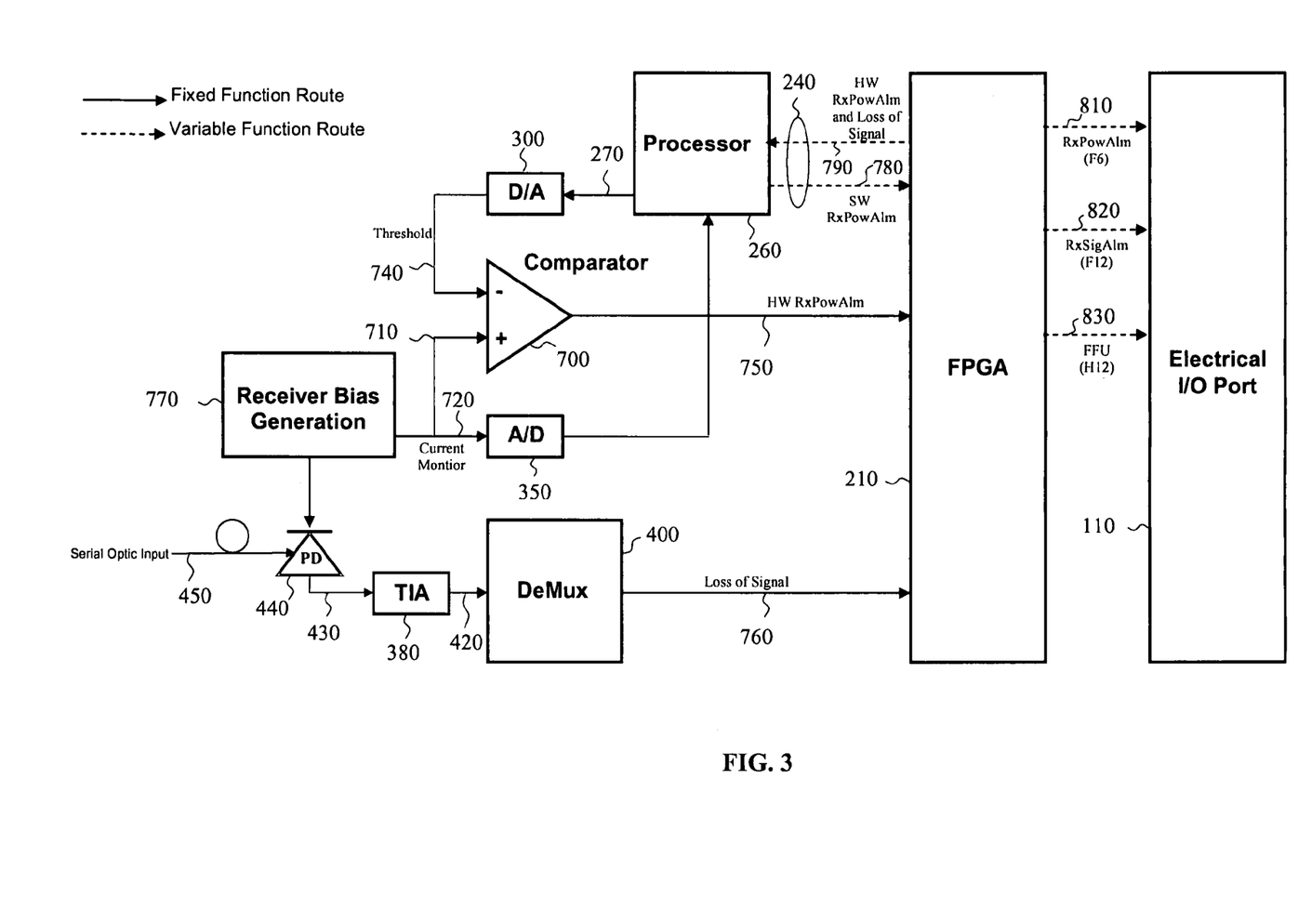
FIG. 3 is a diagram showing routing of a receiver power alarm status signal RxPowAlm in the transponder module of FIG. 1.

By way of example, FIG. 3 shows a configuration wherein the three alarm signals HW RxPowAlm, SW RxPowAlm and "LOS" are routed by the FPGA 210 through the FPGA ports connected to pins F6, F12 and H12 of the 300 pin connector 110, as illustrated by dashed lines 810, 820 and 830. This selections makes use of one of the 10 pins that the 300PIN MSA designates as "FFU", namely the pin H12, and re-assigns the pin F12 from the MSA-specified RxSigAlm signal to one of the aforementioned hardware receive alarm signals, HW RxPowAlm 750 or "LOS" 760.

Note that the dashed lines in FIG. 3 illustrate routing options for the three power alarm signals via existing wire-line connections. By way of example, dashed lines 810, 820 and 830 correspond to pre-provisioned discrete wire-line connections between three different ports of the FPGA 210 and the three pins of the I/O port connector 110, while dashed lines 790 and 780 in the embodiment describe herein correspond to the HW RxPowAlm and SW RxPowAlm signal flow options via the serial bus connection 240.

Even with the constraint that any of the three C&S signals SW RxPowAlm, HW RxPowAlm, and LOS can be routed to any of these three pins, which is assumed herein by way of example only and not to exclude other routing possibilities provided by the invention, there are at least 30 possible configurations that can be provided by re-programming the FPGA, corresponding to different permutations of the three signals between the three ports allowing no more than two of the pins being "open", i.e. not have a signal output passed therethrough. By way of example, Table 1 hereinbelow gives a list of 7 most likely customer selections among the multitude of possible configurations of the receiver power alarm part of the C&S interface.

Allowing signals to be copied to multiple pins, which could also be done upon customer request, further increase the number of possible configuration. Furthermore, the output digital status signals may be configured to comply to any voltage format supported by the FPGA 210, e.g., LVTTL, open drain, etc. Adding possible logic functions between these signals, and using other more advanced signal conditioning within the FPGA 210 drives the number of possibilities practically unlimited, without changing a single trace on the printed circuit card.

As a further advantage, pre-provisioning of hardware communication path 240 between the FPGA 210 and the processor 260, which is another important feature of the present invention, enables to provide additional module configurations wherein the hardware generated alarms, e.g. the LOS and HW RxPowAlm, are routed by the FPGA 210 to the processor 260, as illustrated by an arrow 790. Note that the signals 790, 780 between the processor 260 and the FPGA 210 may be on discrete lines or multiplexed onto a serial bus. By way of example, the routing of the hardware-generated alarms to the processor enables performing further processing of these signals as required, and/or accessing them via an I2C communications bus, which is not shown in FIG. 1 or 3 but can be provided between the processor 260 and the host as an additional software communication link.

TABLE 1

| Customer Request | Pin F6 (MSA RxPowAlm) | Pin F12 (MSA RxSigAlm) | Pin H12 (MSA FFU) |
|---|---|---|---|
| Standard, MSA-defined | SW RxPowAlm | Open | Open |
| Fast RxPowAlm | HW RxPowAlm | Open | Open |
| Standard plus Break Detector on F12 | SW RxPowAlm | Loss of Signal | Open |
| Standard plus Break Detector on H12 | SW RxPowAlm | Open | Loss of Signal |
| Fast plus Break Detector on F12 | HW RxPowAlm | Loss of Signal | Open |
| Fast plus Break Detector on H12 | HW RxPowAlm | Open | Loss of Signal |
| All three | SW RxPowAlm | HW RxPowAlm | Loss of Signal |

As stated hereinbefore, the reconfigurable C&S architecture of optoelectronic modules according to the present invention enables introducing new digital C&S signals to the module's C&S interface without changes to the pc board, provided that appropriate hardware capabilities for a requested new function are pre-provisioned by the module's design.

Figure 4:
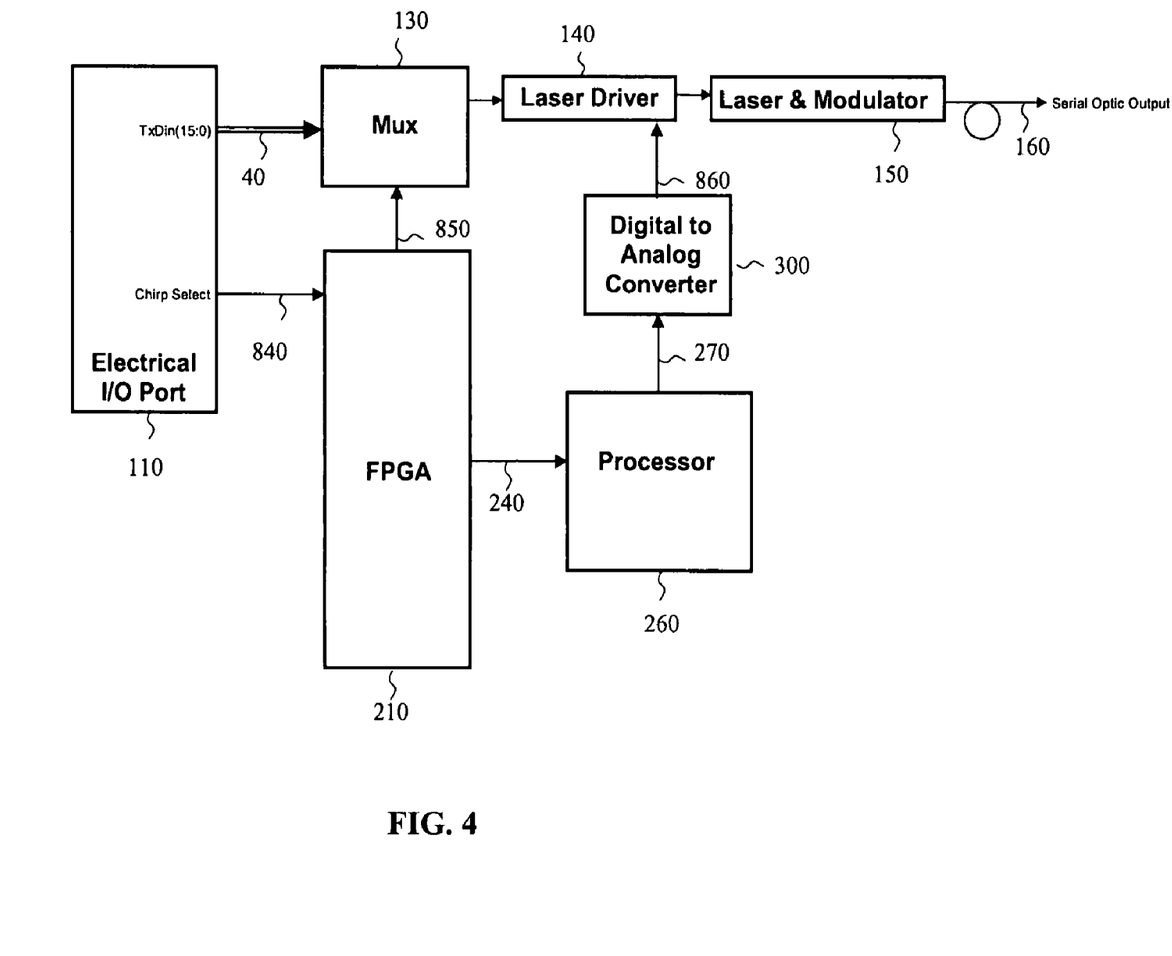
FIG. 4 is a diagram showing routing of a transmitter chirp control signal in the transponder module of FIG. 1.

By way of example, FIG. 4 shows how a digital control signal "Chirp Select" for selecting a chirp parameter of the transmitter 150 can be added to the transponder module 100.

The 300PIN MSA does not specify any pin available for the transmitter chirp selection. However, an ability to change a chirp characteristic of the transmitter can be advantageous, and can be provided by an appropriate design of the laser driver 140, as known to those skilled in the art. A digital "Chirp Select" control signal can then be easily added to a transponder module having the architecture of the present invention without changing the printed circuit board. In the chirp select routing scheme shown in FIG. 4, a "chirp select" pin is selected for the ChirpSelect control signal from the digital C&S pins that are not in use by any other transponder signal, but for which electrical connections to the FPGA ports have been pre-provisioned, as described hereinbelow. By way of example, the pin H6, designated For Future Use (FFU) by the 300PIN MSA but, as a feature of the present invention having an electrical connection 840 to the FPGA 210, can be selected for the newly added control signal. Also by way of example, the chirp select signal is defined so that a binary "1" corresponds to a positive chirp setting, and a binary "0" corresponds to a negative chirp. After downloading an appropriate set of instructions into the FPGA 210 and updating the processor software as required, the FPGA 210 will route the chirp select signal to a data inversion control port of the Mux block 130 via a pre-provisioned communication link 850, and to the processor 260 via e.g. the serial bus 240. The processor 260, once programmed with the appropriate software functions, monitors the state of the pin H6 and, when a change in the pin state is detected, sends a digital signal 270 to a D/A converter 300 for adjusting the analog control signals applied to the Laser Driver 140 as appropriate for positive or negative chirp.

Figure 5:
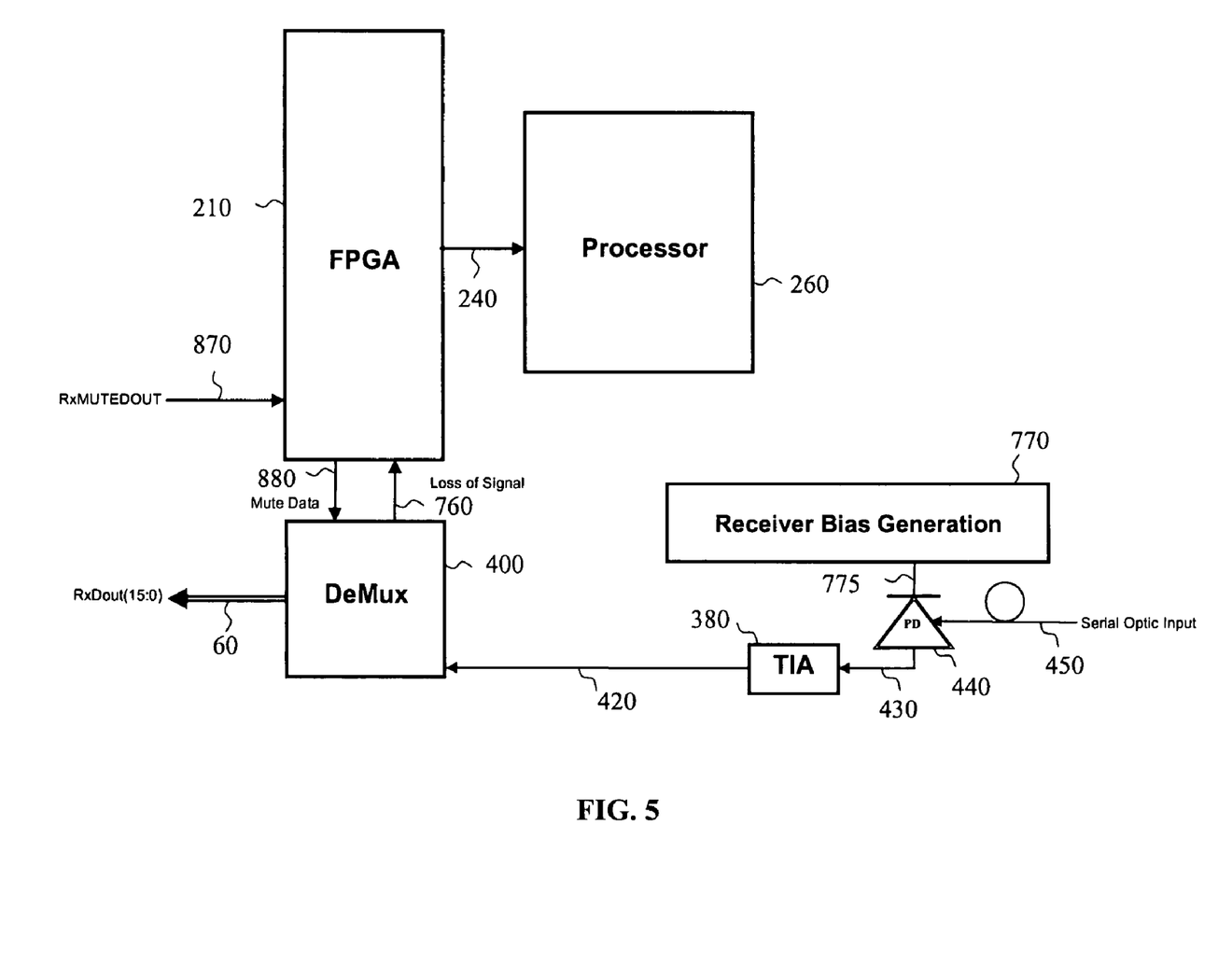
FIG. 5 is a diagram showing routing of a receiver muting control signal RxMuteDOut in the transponder module of FIG. 1.

As a last example, FIG. 5 illustrates another important capability provided by the module's architecture of the present invention, namely an ability to add new functions to the module using existing digital C&S signals without any hardware changes, exclusively by means of making changes in the module's software. This capability is provided by the architectural solution of the present invention, which uses an FPGA as a routing hub between the I/O port 110, the processor 260, and the functional hardware of the module for most, if not all, digital C&S signals. Due to this strategic placement of the FPGA, it becomes possible, by adding new FPGA instructions, to introduce dependencies between different digital C&S signals, e.g. to generate one or more digital control signals in response to the digital status signals received by the FPGA from the functional hardware of the transponder module, thereby providing new functions to the module.

By way of example, the 300PIN MSA specification provides for the host to be able to control the muting of the receive data output signal RxDout via a digital control signal RxMuteDout. However, a customer may require an additional capability to have the data output automatically muted upon encountering a certain alarm, even without generating the RxMuteDout by the host. In this example, that automatic muting is performed when the DeMux 400 detects a loss of signal from the receive chain and generates the LOS signal 760. To enable this, the FPGA 210 is configured to send a mute signal 880 to the DeMux 400 upon receiving either the RxMuteDout signal 870 from the host, or upon receiving the loss of signal indicator LOS 760 from the DeMux 400, or both. Simultaneously, a communication can be sent to the processor 260 from the FPGA 210 informing it of the mute situation so the processor 260 can properly reflect the mute status via, e.g. the serial I2C bus with the host, and/or take further actions as programmed.

The present invention has been described hereinabove in reference to an optical transponder module, it should be appreciated that the present invention provides inventive concepts that can be embodied in a variety of specific contexts. The specific embodiments described herein are merely illustrative of specific ways to make and use the invention and do not delimit the scope of the invention. For example, the inventive digital C&S signal routing architecture of the present invention, as generally illustrated in FIG. 2, can be applied to optoelectronic modules other than transponders, including but not limited to electrical/optical transmitters, receivers, transceivers, tunable lasers, optical signal re-generators such as 3R optical signal regenerating modules having an optical input and an optical output, and an opto-electro-optic converter therebetween, etc.

Of course numerous other embodiments may be envisioned without departing from the spirit and scope of the invention.

Descriptions of Signals

Serial Optic Output—A single optical fiber carrying the serial transmit signal in the optical frequency domain at the serial data rate (R).

Serial Optic Input—A single optical fiber carrying the serial receive signal in the optical frequency domain at the serial data rate (R).

TxPCLK—Transmit Parallel Output Clock, this clock is generated in the module and sent back to the framer to be used to clock the parallel data out of the framer/line card.

TxREFCLK—Transmit Reference Clock, this is the reference clock supplied to the module from which the CMU will generate the serial data clock. TxREFCLK can be either R/16, or R/64, selectable by the TxREFSEL signal.

TxPICLK—Transmit Parallel Input Clock, this clock is used to clock the parallel transmit data into the transponder. The user has the responsibility to synchronize this clock to the TxREFCLK.

TxDin (15:0)—Transmit Data Input Channels 15 to 0, these channels carry the actual data to be multiplexed and transmitted serially on the fiber.

LsENABLE—Laser Enable, turns on and off optical power generation by the laser. The signal must run with a minimal amount of circuitry for safety concerns.

TxRATESEL(1:0)—Transmit Rate Select lines 1 and 0, these discrete control lines set the rate of the transmit circuitry to one of four possible rates based upon the binary encoding of the two lines.

TxREFSEL—Transmit Reference Select, this discrete control tells the module the rate of TxREFCLK to expect, either R/16 or R/64.

TxRESET—Transmit Reset, this discrete control resets the transmit circuitry, including any FIFOs in the transmit path.

TxLOCKERR—Transmit Lock Error, this discrete status signal indicates that TxREFCLK and TxPICLK are the same rate (within tolerance).

ALMINT—Alarm Interrupt, the discrete status signal is a summary alarm indicating one or more alarm or error is active.

RxLOCKERR—Receive Lock Error, this discrete status signal indicates that RxREFCLK and clock recovered from the serial input data stream are the same rate (within tolerance).

RxPOWALM—Receive Power Alarm, this discrete status signal indicates that the received optical power is below threshold.

RxRATESEL(1:0)—Receive Rate Select lines 1 and 0, these discrete control lines set the rate of the receive circuitry to one of four possible rates based upon the binary encoding of the two lines.

RxMUTEDOUT—Receive Mute Data Output, when activated this discrete control line requests the RxDOUT channels to be set to a constant and known value.

RxREFSEL—Receive Reference Select, this discrete control tells the module the rate of RxREFCLK to expect, either R/16 or R/64.

For Future Use/Not Supported—These discrete lines are ones that do not have assigned functions in an Electrical I/O Port standard (For Future Use) or have assigned functions in an Electrical I/O Port standard but are not used by the standard module.

RxDout (15:0)—Receive Data Output Channels 15 to 0, these channels carry the actual data received serially on the fiber after demultiplexing.

RxPOCLK—Receive Parallel Out Clock, this clock is sent out by the module as the clock with which to latch RxDout.

RxREFCLK—Receive Reference Clock, this clock is used to synchronize the receive clocking from the demux with the user. RxREFCLK can be either R/16 or R/64 selectable by the RxREFSEL signal.

RxDTV—Receive Decision Threshold Voltage, an analog signal that allows the user to adjust the 1/0 decision threshold on the receive data to optimize bit error rate.

RxPOWMON—Receive Power Monitor, this analog output signal is proportional to the received optical power.

LsBIASMON—Laser Bias Monitor, this analog output signal is proportional to the laser bias current.

LsPOWMON—Laser Power monitor, this analog signal is proportional to the optical power produced by the laser.

We claim:

1. An optoelectronic module for transmitting or receiving optical signals through a fiber-optic link, the module comprising:

an electrical I/O port for connecting the module to an external host device, comprising first connection means for providing discrete electrical connections therebetween for a plurality of digital control and status (C&S) signals, said plurality of digital C&S signals comprising digital control signals and digital status signals;

an optical port for connecting to the fiber-optic link;

functional hardware responsive to the digital control signals, comprising:

a) one of electro-optic generating means for generating an output optical signal, and opto-electronic receiving means for receiving an input optical signal and for converting thereof into a received electrical signal; and, b) sensing means for providing status information and for generating the digital status signals;

processing means for processing the plurality of digital control and status signals, the processing means comprising a processor and an FPGA;

electrical circuitry for establishing communication paths between the electrical I/O port of the module, the processing means and the functional hardware;

wherein the FPGA is disposed in the communication paths between said first connection means on one side, and the functional hardware and the processor on the other side, and programmed with an instruction set for routing each of the digital control and status signals between the first connection means and the processor, and the first connection means and the functional hardware, thereby providing reconfigurability of said routing by downloading a different set of FPGA instructions.

2. A module according to claim 1, wherein the FPGA has a plurality of ports electrically connected to the first connection means by a plurality of electrical connection leads for communicating the plurality of digital C&S signals therebetween.

3. A module according to claim 2, wherein the I/O electrical port comprises a multi-pin connector, and wherein the first connection means comprises a first plurality of pins.

4. A module according to claim 3, wherein each of the digital C&S signals is associated with a different pin from the first plurality of pins, said pin electrically connected to one of the ports of the FPGA for routing the digital C&S signals according to the FPGA instruction set.

5. A module according to claim 2, wherein a total number of the FPGA ports connected to the first connecting means exceeds a total number of the C&S signals routed by the FPGA.

6. A module according to claim 1, wherein the FPGA is programmed for routing at least one of the digital control signals without substantial modification thereof to the processor.

7. A module according to claim 1, wherein the communication path between the FPGA and the processor comprises at least one of: a plurality of discrete electrical leads, a parallel bus and a serial bus.

8. A module according to claim 1, wherein the processor is programmed to modify at least one of the control signals received from the FPGA for forming a modified control signal, and for communicating the modified control signal back to the FPGA for further routing thereof to the functional hardware.

9. A module according to claim 1, wherein the FPGA is programmed for processing at least one of the control signals for forming a modified control signal, and for routing said modified control signal to the functional hardware.

10. A module according to claim 1, wherein the digital status signals comprise a status signal generated by the processor from an output signal provided by the sensing means, and routed by the FPGA to the first connection means.

11. A module according to claim 1, wherein the digital status signals comprise one or more digital status signals generated by the sensing means and sent therefrom bypassing the processor directly to the FPGA, for routing said one or more digital status signals to the first connection means.

12. A module according to claim 11, wherein at least one of said one or more digital status signals is routed by the FPGA to the processor for performing at least one action selected from the group of actions consisting of: processing said signals, and communicating said signals to the host device via a serial bus.

13. A module according to claim 1, wherein the functional hardware is provisioned to provide first information pertinent to one of the digital status signals to the processor for processing therein, and second information pertinent to said digital status signal to the FPGA bypassing the processor, and wherein the FPGA is programmable to form said digital status signal for outputting thereof via the electrical I/O port based upon any one of the first information, the second information, and a combination thereof.

14. A module according to claim 1, wherein the FPGA is programmed to generate at least one digital control signal in response to at least one of the digital status signals.

15. A module according to claim 3, wherein the multi-pin connector is a 300-pin MSA connector.

16. A module according to claim 3 for transmitting and receiving optical signals through the fiber-optic link, wherein the functional hardware comprises:

electro-optic generatng means for generating an output optical signal;

opto-electronic receiving means for receiving an input optical signal and for converting thereof into a received electrical signal;

an electrical multiplexer for multiplexing a plurality of input electrical data signals received from the host device into a multiplexed electrical data signal for communicating thereof to the electro-optic generating means; and, an electrical de-multiplexer for de-multiplexing an electrical data signal provided by the opto-electronic receiver into a plurality of parallel output electrical data signals for communicating thereof to the host device.

17. A module according to claim 16, wherein the sensing means include one or more sensors coupled to the electrical multiplexer, and one or more sensors coupled to the electrical de-multiplexer, for generating digital status signals for passing thereof to the FPGA.

18. An optoelectronic module for transmitting or receiving optical signals through a fiber-optic link, the module comprising:

an electrical I/O port for connecting the module to an external host device, comprising first connection means for providing discrete electrical connections therebetween for a plurality of digital control and status (C&S)

signals, said plurality of digital C&S signals comprising digital control signals and digital status signals;

an optical port for connecting to the fiber-optic link;

functional hardware responsive to the digital control signals, comprising:
 a) one of an electro-optic generating means for generating an output optical signal, and an optoelectronic receiving means for receiving an input optical signal and for converting thereof into a received electrical signal; and,
 b) a sensing means for providing status information and for generating the digital status signals;

a processing means for processing the plurality of digital control and status signals, the processing means comprising an FPGA and a processor programmed therewithin;

electrical circuitry for establishing communication paths between the electrical I/O port of the module, the processing means and the functional hardware;

wherein the FPGA is disposed in the communication paths between the electrical I/O port of the module and the functional hardware, and programmed with an instruction set for routing each of the discrete digital control and status signals between the first connection means and the processor, and the first connection means and the functional hardware, thereby providing reconfigurability of said routing by downloading a different set of FPGA instructions.

* * * * *